United States Patent
Islo

[15] 3,682,237
[45] Aug. 8, 1972

[54] SEMICONDUCTOR COOLING SYSTEM AND METHOD

[72] Inventor: Henry Ervin Islo, Johanneshov, Sweden

[73] Assignee: AGA Aktiebolag, Lidingo, Sweden

[22] Filed: July 20, 1970

[21] Appl. No.: 56,408

[30] Foreign Application Priority Data

July 25, 1969    Sweden.........................10498

[52] U.S. Cl.......................................165/1, 165/105
[51] Int. Cl..............................................F28d 15/00
[58] Field of Search.................................165/1, 105

[56] References Cited

UNITED STATES PATENTS

| | | |
|---|---|---|
| 2,484,542 | 10/1949 | Atwood.....................165/105 |
| 2,288,341 | 6/1942 | Addink......................165/105 |
| 2,040,159 | 5/1936 | Vernet.......................165/105 |

*Primary Examiner*—Charles Sukalo
*Attorney*—Larson, Taylor and Hinds

[57] ABSTRACT

In a method and a system for cooling semiconductors submerged in a liquid, the semiconductors, one or several, are, together with the liquid, arranged in a tank connected to a heat exchanger. The heat transport from the semiconductors takes place by the latent heat of vaporization of the liquid, transferring the heat to the heat exchanger. The pressure in the system is substantially non-varying.

2 Claims, 1 Drawing Figure

PATENTED AUG 8 1972
3,682,237
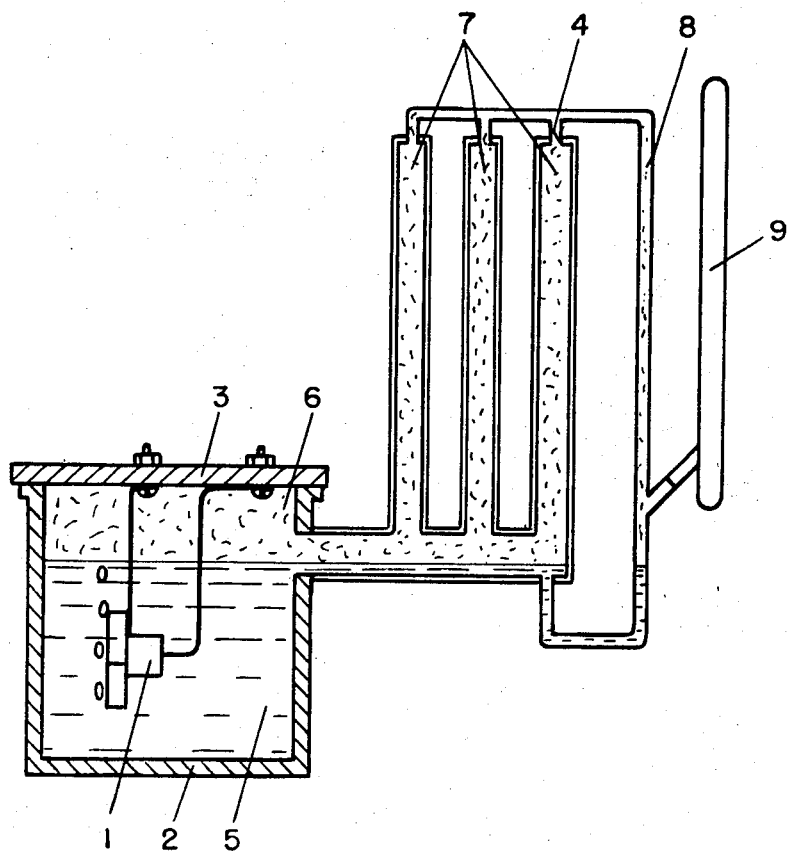
INVENTOR
HENRY ERVIN ISLO
Sarson, Taylor and Hinds
ATTORNEYS

SEMICONDUCTOR COOLING SYSTEM AND METHOD

FIELD OF THE INVENTION

The present invention relates to a method for cooling semiconductors in power sources and a cooling system used for this method.

BACKGROUND AND SUMMARY OF THE INVENTION

Prior methods for cooling semiconductors used cooling vanes of a high heat-conducting metal to which the semiconductor is attached. Thus the known cooling systems consist of aluminum cooling vanes which are not capable of keeping the semiconductors within the specified temperature range at high current load.

When using semiconductors – thyristors and diodes – in power sources, such as welding machines or other rectified power sources, the overheating problem is particularly important. At high currents the generated heat is in the area of several hundred watts. Cooling vanes generally are not capable of transporting and radiating so much heat energy from thyristors and diodes.

The above mentioned drawbacks are, however, removed by using the method according to the present invention, which is characterized in that the semiconductors are submerged in a liquid and the latent heat of vaporization of the liquid transports the heat from the semiconductors by nucleate boiling and vapor flow to radiating surfaces where condensation occurs.

A cooling system used for the method is characterized by a tank for a liquid into which semiconductors are submerged and by at least one heat exchanger connected to the tank.

In this system the latent heat of vaporization of a liquid is used to transport the heat from the thyristors and diodes by nucleate boiling to radiating surfaces by condensation. Many hundreds of watts of heat energy can be removed from a small surface in this way while still retaining a state of nucleate boiling. Also, the surface need not be more than one or two degrees warmer than the boiling temperature of the fluid.

A preferred embodiment of the cooling system according to the invention is described hereafter with reference to the annexed drawing.

BRIEF DESCRIPTION OF THE DRAWING

The single FIGURE is a schematic diagram of a preferred embodiment.

DESCRIPTION OF THE PREFERRED EMBODIMENT

The cooling system basically consists of a metal tank 2 lined with insulating material and having a cover 3. The tank 2 contains a liquid 5 which boils at a specified temperature. The semiconductor 1 is submerged in the liquid 5. To the tank 2 is connected one or several radiators 7. The radiating unit has one or several air exit holes 4, the number depending on how the radiators 7 are connected. Leading from the air exit holes is a pipe 8 to an inflatable bag 9. As the liquid boils at the heated surfaces of the semiconductor 1 the vapor 6 advances along the radiators 7, condenses, and runs back to the tank 2. The distance the vapor 6 advances along the radiators 7 depends on the radiating capacity per square centimeter and the amount of heat being generated by the semiconductor 1. If these two factors are properly balanced the advancing vapor 6 will be completely condensed before it reaches the exit holes 4 when the apparatus is operating at full capacity. As the vapor 6 advances it pushes the air out of the radiators 7 through the air exit holes 4 and into the bag 9. When the apparatus is turned off the vapor 6 condenses and the same air moves back into the radiators 7. This prevents the accumulation of condensed water vapor in the system. The liquid level in the tank should be somewhat higher than the bottom of the heat exchanger unit and the bottom of the connection pipe between the tank and the heat exchanger unit.

The manner in which the radiators are connected depends largely on the construction of the radiators. The air exit should be located at the top of a radiator in which the vapor is advancing from the bottom up. In general the vapor is denser than the air so that the air tends to float on top of the vapor. If the vapor is introduced at the bottom of the radiator a well defined border between the vapor and air is maintained. Several heat exchangers or radiators can be connected in series instead of parallel connection as shown. If the radiators are connected in series, then the air exit hole should not be located in a radiator in which the vapor is advancing from the top down. In this situation the condensed liquid runs down the cool lower portion of the radiator and, together with the heavier vapor being introduced at the top, disrupts the well defined border between the vapor and air in the radiator. A good deal of mixing of vapor and air occurs. If the exit hole is located in one of these downflow radiators vapor escapes through the hole.

Experiments made with a 250 amperes MIG welding power source having a cooling system according to the invention gave the following results. The machine was driven at 300 amperes for more than 4 hours (2 hours - half hour bread - 2 and ½ hours) at 100 percent duty cycle without varying from 74.5° C. and without other difficulty. From the experiments it was found that the base of the thyristors never exceeded 75° C. even under full load. Thus, any machine using this system can be used at 100 percent duty cycle over the full current range of the thyristors.

To get a still higher efficiency it is possible to incorporate in the system a fan blowing cooling air around the heat exchangers. It is also possible to surround the heat exchangers with a cooling liquid (e.g. water). The choice of liquid in the tank depends on the temperature at which the system is to operate. In the abovementioned experiment 1,1,1 trichlorethane ($CL_3C - CH_3$) was used. This liquid is completely non-flamable and non-toxic.

The same tank can be used for cooling many semiconductors separated only by thin bakelite partitions.

The heat transport should take place in a system having atmospheric pressure. The preferred system described above is a closed system, i.e. there is no connection between the inside of the system and the atmosphere surrounding the system. It is, however, possible to modify the system by disconnecting the bag so that the pipe is open to the surrounding atmosphere. A requirement for the modified system is that the surrounding atmosphere should be absolutely dry so that the liquid in the system is not destroyed. To protect the open system from moisture, a water absorbing filter can be connected to the pipe.

The cooling system is partly described above in connection with welding machines. The invention is, however, applicable to cooling semiconductors in general, as for instance in electrical systems for trains.

I claim:

1. A method for cooling semiconductors in power sources, comprising submerging the semiconductors in a liquid, permitting the liquid to vaporize and pass to a heat exchanger, such that the latent heat of vaporization of said liquid transports the heat from said semiconductors to the surfaces of the heat exchanger by condensation, and maintaining the system substantially at atmospheric pressure, wherein the heat transport takes place in a closed system by transferring the air in the heat exchanger to an inflatable bag as the vapor moves into the beat exchanger.

2. A cooling system for cooling semiconductors in power sources, comprising a substantially closed tank containing a liquid in which the semiconductors are submerged, a heat exchanger, means for passing liquid vapor from the tank to the heat exchanger and condensed liquid from the heat exchanger to the tank, and means for maintaining a generally uniform pressure in the system comprising an air outlet and inlet near the top of the heat exchanger through which air exits or enters as vapor enters from and returns to the tank, and an inflatable bag connected to said air outlet and inlet.

* * * * *